United States Patent [19]
Hamilton

[11] 3,921,899
[45] Nov. 25, 1975

[54] ELECTRONIC FURNACE CONTROL SYSTEM

[76] Inventor: Clair Hamilton, 2149 105th Lane NW,, Coon Rapids, Minn. 55433

[22] Filed: July 19, 1974

[21] Appl. No.: 490,015

[52] U.S. Cl. ............................. 236/9 A; 236/11
[51] Int. Cl.² ...................... F24D 5/04; F24F 11/00
[58] Field of Search ................ 236/11, 9 A, 9 R

[56] References Cited
UNITED STATES PATENTS
| | | | |
|---|---|---|---|
| 3,486,693 | 12/1969 | Stang, Jr. et al. | 236/9 A |
| 3,493,174 | 2/1970 | Willson | 236/9 A |
| 3,584,988 | 6/1971 | Hirsbrunner | 236/10 |

*Primary Examiner*—William E. Wayner
*Attorney, Agent, or Firm*—Williamson, Bains & Moore

[57] ABSTRACT

An electronic furnace control system for forced air gas or oil fired furnaces includes an operating relay circuit for the furnace fan which is operated by a variable timing circuit shortly after fuel is supplied to the furnace burner. A latching circuit latches the fan motor relay circuit in a closed condition to substantially continuously operate the furnace fan as long as the furnace thermostat is closed and requires heat. The temperature in the furnace hot air plenum chamber is continuously monitored by a temperature sensing circuit which controls the solenoid operated valve of the furnace burner. A reset timing circuit resets the fan motor relay latching circuit after a predetermined delay when the furnace thermostat de-energizes the valve controlling solenoid.

4 Claims, 3 Drawing Figures

ELECTRONIC FURNACE CONTROL SYSTEM

SUMMARY OF THE INVENTION

This invention relates to an electronic control system for a furnace.

In conventional forced air gas or oil fired furnaces, fuel is supplied to the furnace burner when the associated solenoid control valve is energized by a thermostat. The fuel continues to burn until the thermostat is satisfied. The furnace blower, which is controlled by a heat responsive bimetal disc and a mechanical switch, is energized usually after a delay of three to four minutes. Thus, in the conventional electronic control systems for furnaces, the fuel may be turned on and off periodically, even though the thermostat is in the closed condition and requires heat. Therefore, the furnace blower mechanism may be on for a substantial period of time, even though the furnace burner is off. With this electronic control system, it has been found that the average stack temperature for the furnace is greatly reduced, as well as actual heat lost through the stack. The novel electronic control responds faster than electromechanical control, and therefore, the various operational steps are more efficiently performed.

It is therefore a general object of this invention to provide an electronic control system for forced air gas or oil fired furnaces which closely controls operation of the furnace burner and fan to thereby promote efficient heating and minimize the loss of heat during the heating cycle.

More specifically, during the heating cycle, while the fan is allowed to run substantially continuously, the temperature in the furnace hot air plenum chamber is constantly monitored by a sensing circuit which is operable to open and close the circuit to the solenoid operated burner valve in response to predetermined changes of temperature in the plenum chamber. It has been found that through the use of this novel electronic control system, conventional furnaces not only heat more efficiently, but the control system also permits a substantial savings in fuel consumed during each heating cycle. The electronic furnace control enables the furnace to be electronically controlled and adjusted for maximum efficiency.

These and other objects and advantages of this invention will more fully appear from the following description made in connection with the accompanying drawings wherein like reference characters refer to the same or similar parts throughout the several views.

FIGURES OF THE DRAWINGS

DESCRIPTION OF THE PREFERRED EMBODIMENT OF THE INVENTION

Figure 1:
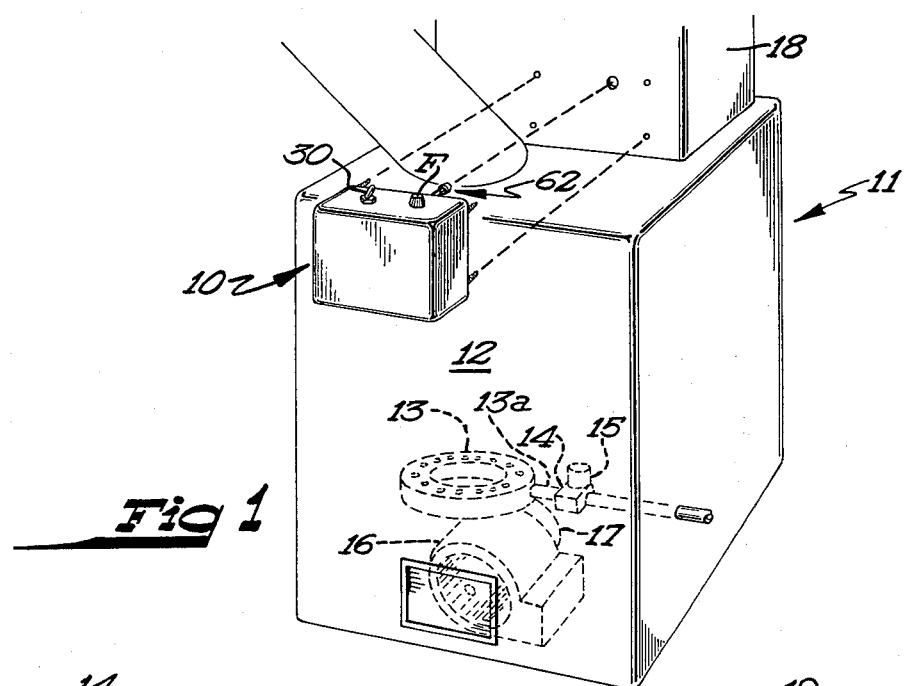
FIG. 1 is a diagrammatic view of a conventional furnace incorporating the novel electronic control system.
Figure 2:
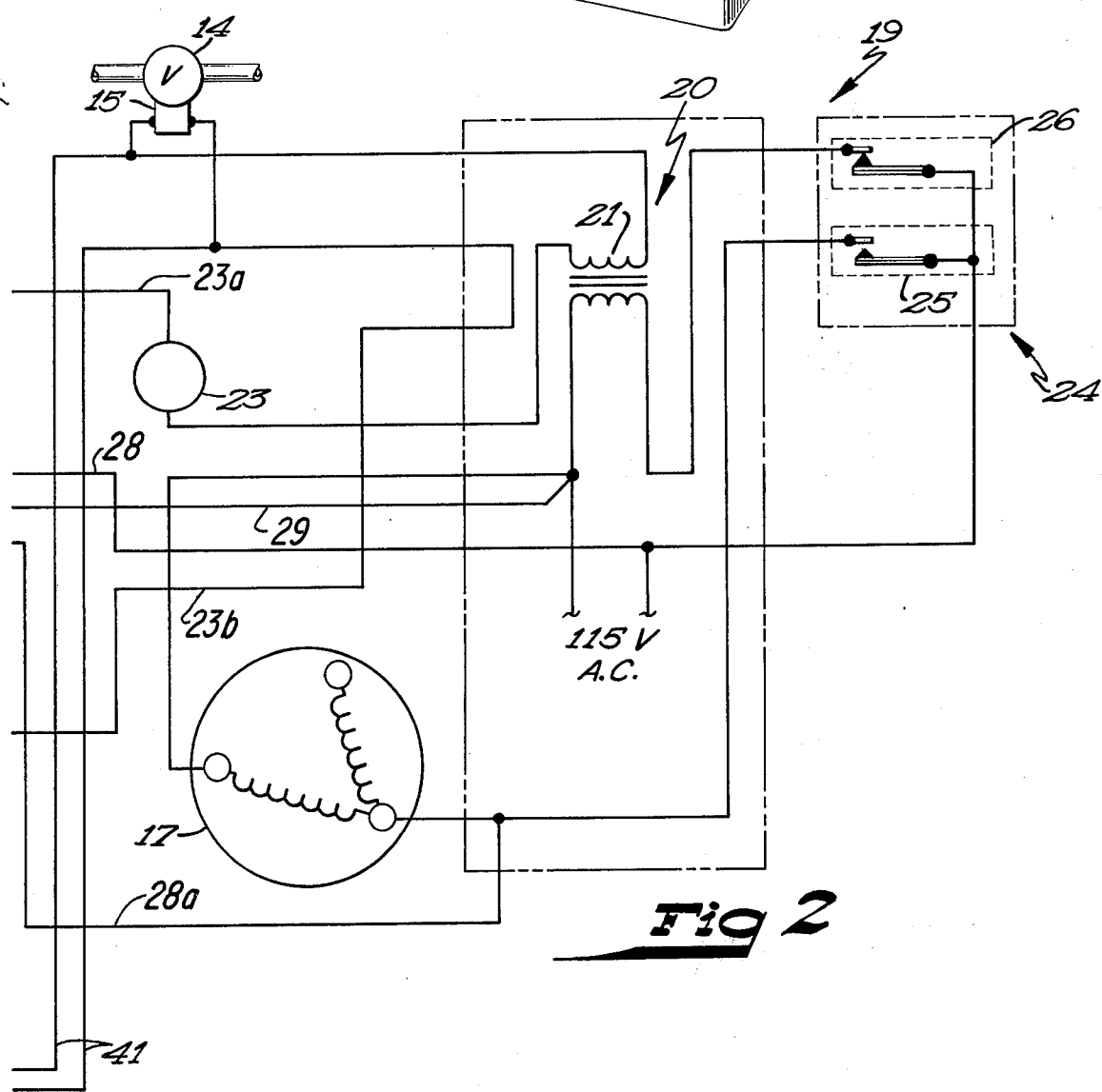
FIG. 2 is a diagrammatic illustration of a conventional furnace operating circuit.

Referring now to the drawings, and more specifically to FIG. 1, it will be seen that the novel electronic control system 10 is shown mounted on a conventional forced air oil or gas fired furnace 11. The furnace includes a burner chamber 12, having a conventional burner 13 mounted therein which is connected to a suitable source of fuel by a conduit 13a. A valve 14 is disposed in flow-controlling relation in the conduit 13 and the valve is operated by a conventional solenoid 15. A fan or blower 16 is operated by a fan motor 17 and serves to circulate air heated by the furnace through the plenum chamber 18 into heating conduits which distribute the heated air.

The furnace also includes a conventional furnace operating circuitry 19 which includes a transformer circuit 20 comprised of a transformer 21 connected to a source of electrical current. The furnace operating circuitry also includes a thermostat circuit 23 which is connected to the transformer circuit 20 disposed in controlling relation with respect to the solenoid 15. It will be appreciated that when the thermostat 23 is in the off condition or does not require heat, the solenoid 15 will be deenergized. However, when the thermostat closes or requires heat, the solenoid 15 will be energized.

The furnace operating circuitry also includes a fan circuit 24 connected to 115 VAC power and transformer circuit, and is connected to the windings of the fan motor 17. The fan circuit 24 has a normally open heat responsive bimetal and mechanical switch 25 disposed therein which closes when the heat within the plenum chamber exceeds a predetermined magnitude. The fan circuit also has a normally closed heat responsive bimetal and mechanical limit switch 26 disposed therein which is connected in series with 115 VAC power to the transformer 21 which opens when the heat in the plenum chamber exceeds a predetermined level. This bimetal and mechanical limit switch functions as a safety device.

Figure 3:
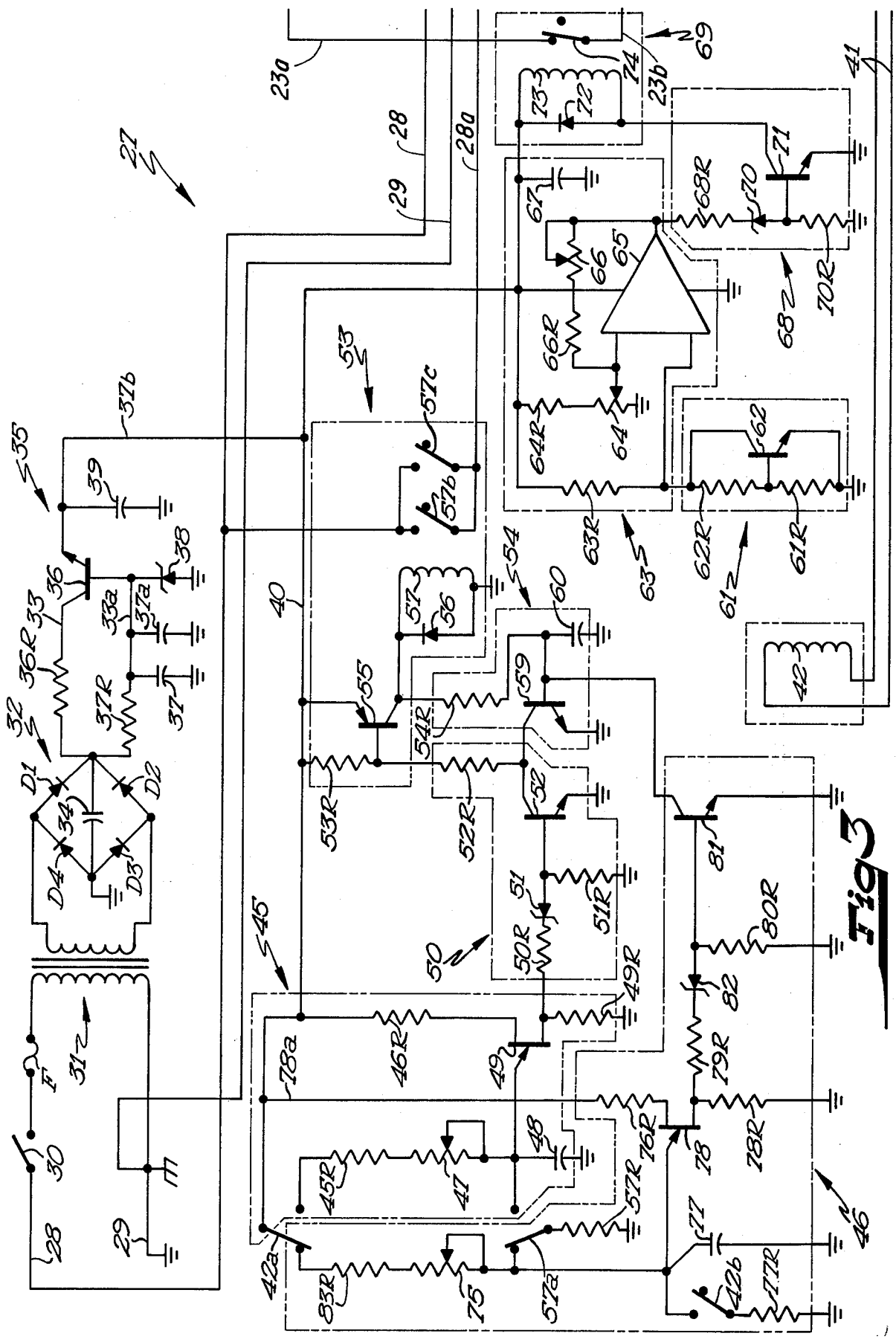
FIG. 3 is a diagrammatic view of the novel electronic control circuit the furnace operating circuit and the electronic control circuit constituting the entire operating and control circuit for the furnace.

Referring now to FIG. 3, it will be seen that the electronic furnace control circuitry 27 includes electrical conductors 28 and 29 which are connected to the source of electrical power (115 VAC). The conductor 28 has a master ON-OFF switch 30 and a fuse F connected in series therein. It will be seen that the master switch 30 permits the control circuitry to be selectively used. The conductors 28 and 29 are connected to a transformer circuit 31 of conventional construction, the transformer circuit being connected to a conventional diode bridge rectifier circuit 32. The rectifier circuit includes a capacitor 34 and four diodes D1, D2, D3 and D4, arranged to define the arms of the bridge. Conductors 28 and 29 are also connected to the transformer circuit of the conventional furnace operating circuitry.

The rectifier circuit 32 is connected to a conventional transistorized regulator and filter circuit 35. Transistor 36 is connected by conductor 33 through a resistor 36R to the bridge circuit 32. The other conductor 33a is connected to a pair of grounded capacitors 37 and 37a, and a zener diode 38 to the base of a transistor 36. It should also be noted that the bridge output is connected through resistor 37R to conductor 33a. A capacitor 39 is connected by conductor 37b to transistor 36, and main voltage bus 40. The diode bridge rectifier circuit 32 and the regulator and filter circuit 35 may be procured as a unit, and these circuits merely operate in a conventional manner to provide steady DC voltage to the main bus 40.

When the thermostat 23 closes, the solenoid 15 will be energized, operating valve 14, and fuel will be supplied to the burner. When this occurs, the relay 42 connected by conductors 41 to the thermostat circuit will be energized. The relay contacts 42a and 42b of relay 42 will be shifted from the normally closed circuit, as shown in FIG. 3, to a normally open circuit. Relay 42 is disposed in circuit controlling relation with respect to a fuel-on timing circuit 45 and the fuel-off reset circuit 46. When the fuel-on timing circuit 45 is energized, the capacitor 48, which is connected to unijunction 49, relay contact 57a normally open circuit, as well as through potentiometer 47 and a resistor 45R to relay 42a normally open contact circuit, will be charged. The charging time of capacitor 48 is approximately 15 to 30 seconds, adjustable by potentiometer 47, preferably 20 seconds. When capacitor 48 is charged to a given voltage level, it will energize unijunction 49 which emits a pulse across resistor 49R as well as through resistor 50R to zener diode 51. It will be also noted that the unijunction 49 is also connected through a resistor 46R to the main bus 40. It will further be noted that the unijunction 49 is also grounded through resistor 49R.

The fan control circuit 50 includes a zener diode 51 which is connected through a resistor 50R to the unijunction 49. When the pulse is emitted by the unijunction 49, the pulse will fire the zener diode 51 which will energize the base of the control transistor 52. It will be noted that the zener diode 51 is connected to ground through a resistor 51R. When the base of the transistor 52 is energized, the output signal therefrom is conducted through a resistor 52R to a fan motor relay circuit 53 and energizes base of transistor 55.

The fan motor relay circuit 53 includes a driver transistor 55 and the output signal from the driven transistor 55 energizes a fan motor relay 57 closing the normally open contact circuits 57a, 57b and 57c. It will be seen that when the relay contacts 57b and 57c are in the normal open circuit the windings to the fan motor are energized, thereby operating the fan. An electrical conductor 28a interconnects the relay contacts 57b and 57c to the fan circuit 24. As pointed out above, the fuel-on timing circuit 45 is usually set to delay operation of the fan until the expiration of approximately 20 seconds after the burner is supplied with fuel. Relay contact 57a is connected to ground through a resistor 57R, and when shifted to the normally open circuit, shorts out capacitor 48 through resistor 57R so that only one pulse is emitted by the unijunction 49 during the heating cycle. It will be noted that a diode 56 is connected across the relay 57 and serves to minimize damage to the driver transistor 55 during relay de-energizing time. It will further be noted that the fan motor relay circuit 53 is not only connected to the main bus 40 through the driver transistor 55, but a resistor 53R is connected across the base of the driver transistor to the main bus 40.

The output signal from the driver transistor 55 is conducted to a transistor 59 through a resistor 54R in the relay latching circuit 54 to thereby latch the fan motor relay circuit 53 contacts in the normally open circuit condition. It will be noted that the relay latching circuit 54 includes a capacitor 60, which serves as a filter for voltage noise generated as a result of the motor sound. At this point in the operation of the furnace, the burner will be in an on condition and the fan will be operating to circulate the heated air.

The control circuitry 27 also includes a temperature sensing circuit 61 for constantly sensing or monitoring the temperature in the hot air plenum chamber. The sensing circuit 61 includes a temperature sensing transistor 62 which actually projects into the hot air plenum chamber and which has a resistor 61R and a resistor 62R in series across its base, transistor 62, resistor 62R, comparator and amplifier 65 are connected through resistor 63R to main bus 40. The transistor 62 actually senses the temperature change in the hot air plenum chamber and a voltage signal is transmitted to the comparator and amplifying circuit 63. The resistor network 64R and adjustable potentiometer 64 are preset to turn on comparator and amplifying circuits when temperature in the hot air plenum chamber 18 is in the increasing order and reaches a maximum predetermined efficiency level.

When the signal does exceed a predetermined level, the signal will be amplified by an amplifier 65 and will be transmitted to the transistorized relay control circuit 68. It will be noted that the comparator and amplifier 65 is connected to the main bus 40 and that a potentiometer 66 is connected across the comparator and amplifier 65 through a resistor 66R. The resistor network 66R and adjustable potentiometer 66 preset the electronic hysteresis of comparator and amplifier 65, allowing temperature sensor transistor 62 to monitor temperature changes in the decreasing order, and when a predetermined temperature level is reached, the comparator and amplifier circuit 63 turns off. It will further be noted that the comparator and amplifying circuits 63 also have a capacitor 67 which is grounded and which serves to merely filter voltage generated by the noise of the fan motor.

The amplifier output signal from the comparator and amplifying circuit 63 is transmitted through a resistor 68R to a zener diode 70 which fires the base of the transistor 71. it will be noted that the junction between the zener diode and the base of the transistor 71 is connected to ground through a resistor 70R. The output signal from the transistor 71 is received by relay circuit 69, which normally closed contact 74 circuit is connected in controlling relation with the solenoid 15 and relay 42. One of the contacts of relay 74 is connected by a conductor 23a to the thermostat circuit 23. The other contact of relay 74 is connected by a conductor 23b to the solenoid 15. Therefore, when the relay 73 is energized, the normally closed relay contact 74 circuit will be open thereby de-energizing relay 42 and solenoid 15 turning off the supply of fuel to the burner. A diode 72 is connected across the relay 73 to protect transistor 71 when relay 73 de-energizes, and when the relay 73 is energized, the relay 42 will be de-energized, thereby opening the normally opened contact circuits 42a and 42b to the fuel-on timing circuit and to the fuel-off reset circuit.

When relay 42 is de-energized, the fuel-on timing circuit 45 will also be de-energized and the capacitor 77 in the fuel-off reset circuit begins it charging time cycle. In this respect, it is pointed out that the time required to charge capacitor 77 sufficient to fire the unijunction 78 is from approximately 1 to 5 minutes and is controlled by adjustable potentiometers 75. Therefore, even though the fuel-on timing circuit 45 is de-energized, the driver transistor 55 is latched in the on condition by the transistor 59 of the relay latching circuit, thereby permitting the fan to continue to operate.

The relay circuit 69 will remain in the open condition until the temperature within the plenum chamber falls below the predetermined magnitude, and when this occurs, the changing temperature will be sensed by transistor 62 and transmitted to the comparator and amplifier circuit so that the control circuit 68 will be de-energized. When this occurs, the normally closed relay contact circuit 74 will be closed and will energize relay 42 and solenoid 15. However, since the fan motor relay circuit 53 has been latched in the closed condition, the capacitor 48 will continue to be shorter through relay contact 57a normally open circuit and resistor 57R, and no pulse will be emitted by unijunction 49. Relay contact 42b will ground the capacitor 77 through resistor 77R and thereby permit the capacitor to be discharged when relay 42 and solenoid 15 are energized to supply fuel to the burner. Capacitor 77 is discharged early in its charge cycle, below the firing voltage level of unijunction 78, thus allowing a new charge cycle every time relay 42 is de-energized. During the heating cycle, the thermostat will remain in a closed condition, but the temperature sensing circuit 61 will be operable to interrupt the current to the solenoid to prevent excessive stack temperatures. With this arrangement, stack temperatures will not be excessive and the heat will be efficiently distributed by the fan which continues to operate. The above electronics efficiency cycle of the furnace will continue until the thermostat 23 is satisfied or open.

However, when the thermostat opens in response to the temperature sensed by the thermostat reaching a predetermined temperature magnitude, the solenoid 15 will be de-energized, interrupting the supply of fuel to the burner. Relay 42 will be de-energized and will return relay contacts 42a and 42b to the normally closed circuit. However, the fan motor relay circuit 53 will remain in the latching condition and the fan will continue to operate. The capacitor 77 in the fuel-off reset circuit is connected to unijunction 78, relay contact 42b normally open circuit, as well as relay contact 57a normally closed circuit and through a potentiometer 75 and a resistor 83R to relay contact 42a normally closed circuit. The capacitor 77 will begin its charging time cycle anew, since the previous charge on the capacitor 77 will have leaked down through the resistor 77R each time the relay 42 is energized. It will be noted that the unijunction 78 is connected to a resistor 76R by an electrical conductor 78a to the main bus 40. When capacitor 77 charges to a given voltage level, it will energize unijunction 78 which emits a pulse across resistor 78R as well as through resistor 79R to zener diode 82 which energizes the base of transistor 81 which de-energizes and resets the relay latching circuit 54 and de-energizes the fan motor relay circuit 53. It will be noted that the zener diode 82 is connected to ground through resistor 80R.

When the fan motor relay circuit 53 is de-energized, the relay contacts 57a, 57b and 57c are returned to the normally closed circuit condition as shown in FIG. 3. Relay contacts 57a disables the charging cycle of capacitor 77 while relay 57 is de-energized. The control is then in condition to again control operation of the valve solenoid and the fan motor, when the thermostat again calls for heat.

Experimental data has indicated that the novel electronic control system 10 substantially reduces the burning time, and thereby reduces the fuel consumption when used in controlling relation with a conventional home-type furnace. For example, when this novel electronic control system was used in controlling relation with respect to a commercially available conventional home furnace, (105,000 BTU input and 85,000 BTU output), for heating a rambler-type house (approximately 2200 square feet of heated area) the operational time of the burner was reduced by approximately 28 percent when compared to operational time of the burner without the electronic control system. Comparison days comparable in temperature to −5° with comparable wind chill factors. It is therefore felt that the reduction in time of the operation of the burner is in direct proportion to the reduction of fuel consumed by the furnace. Comparative tests were also made with respect to the stack temperature of the furnace, with and without the electronic control system 10. When the electronic control system was used with the furnace, the average stack temperature was approximately 222.9°F, but the average stack temperature was approximately 345.5°F when the electronic control system was not used with the furnace. This involved an operation time in excess of 11 minutes.

It is pointed out that the present electronic control system can be easily installed on any conventional forced air oil or gas fired furnace, without requiring alteration of the furnace. It will also be noted that if the electronic control circuitry 27 failed, the furnace operating circuit would continue to operate as though the master switch 30 for the control circuitry had been opened. This electronic furnace control system is designed in a fail safe manner, and the furnace would invert back to the mechanical controls and only the efficiency factor would be lost. It has been found that when the novel electronic control system is used for controlling operation of a furnace, there is less fluctuation between normal minimum and maximum house temperatures, or there is less thermostat overshoot when the novel electronic control system is used for controlling operation of the furnace. I have provided a multi-adjustable electronic furnace control which can electronically sense the hot air plenum temperatures and which is adjustable to operate the conventional forced air gas or oil fired furnaces at an increased efficiency temperature band with less stack heat loss. It will also be seen that the electronic furnace control may be adjusted to operation of a furnace within an optimum temperature range.

Thus it will be seen that I have provided a novel electronic control system which may be readily incorporated on any conventional forced air gas or oil fired furnaces, and which is operable to increase efficiency of the furnace, but is also operable to reduce fuel consumption of the furnace.

Thus it will be seen that I have provided a novel electronic furnace control system, which is not only of simple and inexpensive construction, but one which functions in a more efficient manner than any heretofore known comparable systems.

What is claimed is:

1. An electronic furnace control system for forced air gas or oil fired furnaces including a plenum chamber, a burner mechanism connected to a source of fuel, a valve controlling the flow of fuel to the burner mechanism, a solenoid operating the valve, a motor driven fan for circulating air, a furnace operating circuit connected with the fan motor and solenoid, a thermostat for controlling operating of the furnace operating circuit, said electronic furnace control system comprising:

a normally open fan relay circuit connected with the furnace operating circuit, a relay latching circuit connected with the fan relay circuit, a delayed electronic pulse-emitting timing circuit including a pulse emitter which emits a single delayed pulse signal after the timing circuit has been energized, a relay switching circuit connected with the furnace operating circuit and pulse-emitting timing circuit and being operable to energize the later when the solenoid is energized by the thermostat, a gated control circuit connected with the fan relay circuit and relay latching circuit and being operable to receive the pulse signal from the pulse emitter and to energize the fan relay circuit and relay latching circuit, said relay latching circuit being operable to latch the fan relay circuit in closed condition while the furnace operating circuit has been closed by the thermostat, an electronic temperature sensing circuit being operable to sense the temperature in the plenum chamber and providing a changing voltage signal in response to changes in temperature in the plenum chamber, the voltage signal provided by the electronic temperature sensing circuit decreasing in magnitude as the temperature in the plenum chamber increases and increasing in magnitude as the temperature in the plenum chamber decreases, a comparator and amplifying circuit receiving the output voltage from the sensing circuit and amplifying said voltage when it exceeds a predetermined magnitude, said comparator and amplifier circuit including adjustable circuit means for sensing temperature changes in an increasing order of magnitude and including an adjustable electronic hysteresis circuit means for sensing temperature changes in the decreasing order of magnitude, whereby the electronic furnace control may be adjusted to control operation of the furnace within an optimum temperature range, a normally closed solenoid relay circuit connected with a solenoid and with the comparator and amplifying circuit said solenoid circuit receiving the recurrent amplified output voltage from the comparator and amplifying circuit and being operable to de-energize the solenoid, said solenoid relay circuit being closed to energize the solenoid when the temperature in the plenum chamber falls below a predetermined level, and while the furnace operating circuit is closed by the thermostat, a delayed pulse-emitting reset timing circuit connected with the relay switching circuit, the fan relay circuit and relay latching circuit, and being operable to emit a delayed pulse signal to de-energize and reset the fan relay circuit and relay latching circuit when the furnace thermostat has opened the furnace operating circuit.

2. The electronic furnace control system as defined in claim 1 wherein said fan relay circuit includes a driver transistor, and said latching circuit includes a transistor, and said latching circuit includes a transistor which is latched to the driver transistor when the latching is energized by the gated control circuit.

3. The electronic furnace control system as defined in claim 1 wherein said temperature sensing circuit includes a transistor, and a resistance connected across the base and collector of said temperature sensing transistor.

4. The electronic furnace control system as defined in claim 1 and a step down transformer and rectifying bridge with a filtered and regulated output to the main bus for supplying a steady operating voltage to said electronic circuits.

* * * * *